United States Patent [19]

Zibritosky

[11] 4,324,373
[45] Apr. 13, 1982

[54] METHOD AND APPARATUS FOR ADD-ON REINFORCEMENT FOR TRANSPARENCY SYSTEM FOR CREW MODULE FOR AIRCRAFT

[75] Inventor: George Zibritosky, Pittsburgh, Pa.
[73] Assignee: PPG Industries, Inc., Pittsburgh, Pa.
[21] Appl. No.: 95,806
[22] Filed: Nov. 19, 1979
[51] Int. Cl.³ ............................ B64C 1/14; E04C 1/00
[52] U.S. Cl. ..................................... 244/121; 52/208; 52/397; 244/129.3; 244/117 R
[58] Field of Search ................... 244/121, 131, 117 R, 244/119, 129.3; 52/208, 398, 400, 98, 1, 827, 397, 822, 7, 88, 80; 428/412

[56] References Cited

U.S. PATENT DOCUMENTS

| | | | |
|---|---|---|---|
| 2,258,724 | 10/1941 | Wagner et al. | 52/208 |
| 2,293,656 | 8/1942 | McClain | 52/208 |
| 2,414,705 | 1/1947 | Ames | 52/208 |
| 2,834,998 | 5/1958 | Wilder | 52/208 |
| 2,939,186 | 6/1960 | Morewood et al. | 52/208 |
| 2,989,787 | 6/1961 | Smith | 52/208 |
| 3,444,662 | 5/1969 | Partain | 52/208 |
| 3,477,667 | 11/1969 | Lock | 244/121 |
| 4,204,374 | 5/1980 | Olson | 244/121 |

FOREIGN PATENT DOCUMENTS

| | | | |
|---|---|---|---|
| 550398 | 1/1943 | United Kingdom | 244/121 |
| 1060031 | 2/1967 | United Kingdom | 244/129.3 |

Primary Examiner—Galen L. Barefoot
Attorney, Agent, or Firm—Edward I. Mates

[57] ABSTRACT

This invention relates to an add-on reinforcement to an aft arch assembly for a transparency system for aircraft that improves the resistance to penetration of a windshield secured to the aircraft or its crew module via said aft arch assembly. This invention also relates to a simple method of securing the add-on reinforcement to the aft arch assembly without requiring substantial disassembly of the windshield.

6 Claims, 6 Drawing Figures

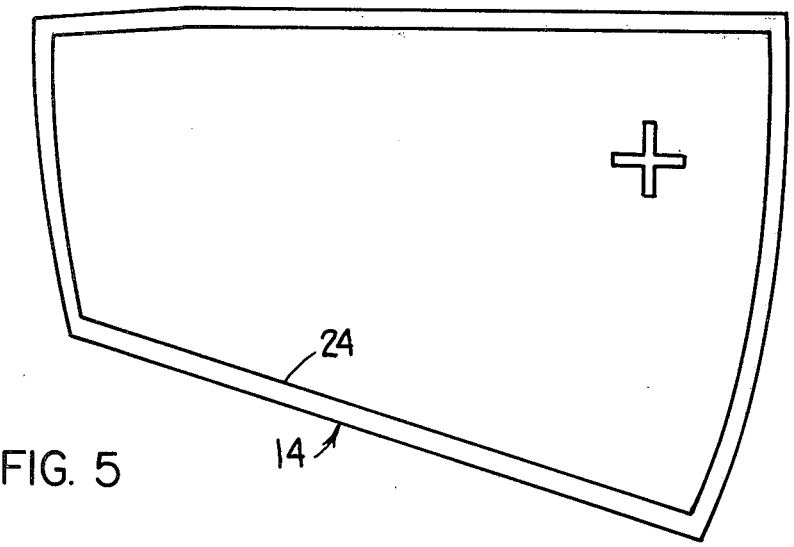

COMPOSITION AND PHYSICAL PROPERTIES OF AFT-ARCH
ASSEMBLY AND ADD-ON REINFORCEMENT

| INGREDIENT OR PHYSICAL PROPERTY | AFT-ARCH ASSEMBLY | ADD-ON REINFORCEMENT |
|---|---|---|
| TITANIUM | 90% | 2.02% |
| ALUMINUM | 6% | 0.22% |
| VANADIUM | 4% | 0.28% |
| CHROMIUM | NONE OF THESE INCLUDED | 14.9% |
| NICKEL |  | 25.1% |
| MOLYBDENUM |  | 1.45% |
| IRON |  | 55.78% |
| OTHERS |  | .25% |
| YIELD STRENGTH | 120,000 PSI (8400 Kg/cm$^2$) | 38,000 PSI (2700 Kg/cm$^2$) |
| ULT. TENSILE STRENGTH | 135,000 PSI (9500 Kg/cm$^2$) | 88,000 PSI (6200 Kg/cm$^2$) |
| ELONGATION TO RUPTURE | 11% | 47% |

METHOD AND APPARATUS FOR ADD-ON REINFORCEMENT FOR TRANSPARENCY SYSTEM FOR CREW MODULE FOR AIRCRAFT

BACKGROUND OF THE INVENTION

1. Field of the Invention

The present invention relates to transparencies for aircraft and particularly relates to a transparency system used in a crew module for aircraft. Particularly, the present invention relates to an improved add-on reinforcement for the aft arch of a transparency system that is used to reinforce the aft arch and the windshields of the transparency system used in the crew module for the F-111 aircraft.

Present day F-111 aircraft are provided with a crew module that can be separated from the aircraft in case the aircraft is severly damaged to the point that it can no longer fly. The crew module forms part of the aircraft and is provided with a transparency system comprising a pair of windshields in the forward part of the crew module and a pair of pivotable canopies in the rear portion of the module. A curved aft arch attached to the crew module is provided to connect the aft portion of the transparent windshields thereto in order to provide a rigid reinforcement and support for the transparent windshields of the crew module. In the past, despite the strength provided by the aft arch to reinforce the transparency system, the aircraft industry was unable to obtain penetration resistance as high as 445 knots when objects such as 4 pound (1.8 kilogram) birds were impacted against the most critical portion of the windshield, namely the aft portion of the windshield in the vicinity of the aft arch.

It is a purpose of the present invention to improve the resistance of the windshields of the transparency system for a crew module to penetration by high speed aircraft colliding with flying objects without adding unduly to the overall weight of the aircraft.

Another purpose of the present invention is to modify existing aircraft that fail to provide adequate impact penetration resistance by a simple method of reinforcing the aft arch of the transparency system in such a manner that it is not necessary to remove the windshields from the transparency system during installation of an add-on reinforcement to the aft arch that provides the desired improvement in resistance to penetration by high speed objects.

2. Description of Patents of Interest

A novelty search was conducted for the presently claimed structure of an add-on reinforcement member for an aft arch assembly and its method of application to reinforce the aft arch assembly with minimum disruption of the installation of a transparency system containing the windshield reinforced by the aft arch assembly. No patents which would appear to show the subject structure or its method of installation were located. Patents of general interest showing windshield mountings were noted and reported as most pertinent. These patents include U.S. Pat. No. 2,258,724 to Wagner et al., which relates to fixation of window panes in aircraft, U.S. Pat. No. 2,293,656 to McClain, which relates to a transparent closure and mounting for aircraft, U.S. Pat. No. 2,414,705 to Ames, which relates to means for attaching thermoplastic sheet to other materials, U.S. Pat. No. 2,834,998 to Wilder, which relates to means for mounting a frangible expanse to a vibratile support, U.S. Pat. No. 2,939,186 to Morewood et al., which relates to an enclosure device such as an aircraft canopy and a mounting therefor, and U.S. Pat. No. 3,477,667 to Lock, which relates to windshields for supersonic aircraft provided with a movable transparent shield.

SUMMARY OF THE INVENTION

The present invention provides a relatively simple manner of reinforcing an aft arch assembly incapable of providing the windshield with a penetration resistance at a velocity as low as 445 knots with a light weight, shaped, relatively flexible, metal reinforcement that can be added on with minimum disruption of the structure of the crew module for the aircraft. This invention comprises an add-on reinforcement of a flexible, preferably non-magnetic metal composition that has a horizontal flange corresponding to the horizontal flange of the aft arch assembly and provided with apertures that coincide with apertures of the horizontal flange of the aft arch that receive windshield attachment bolts. In cases where the aft arch assembly comprises an aft arch connected to an aft arch support previously installed to reinforce the aft arch, the horizontal flange of the add-on reinforcement is provided with a scalloped edge that provides clearance for means that attach the aft arch to the previously installed aft arch support. The add-on reinforcement of the present invention may also comprise a vertical leg that is apertured to provide apertures aligned with corresponding apertures of a vertical leg of the aft arch and the aft arch support of the structure installed previously in the aircraft. Even though the add-on reinforcement of the present invention weighs less than one pound (453.6 grams), it provides sufficient benefit by virtue of its resilient nature to allow the windshield attached thereto to withstand impacts of four pound (1.8 kilogram) birds at speeds as high as 525 knots when subjected to otherwise identical tests at which the transparency system of prior art construction without the flexible add-on reinforcement of the present invention failed at impacts of 445 knots. Scalloped edges may be provided in the vertical leg of the add-on reinforcement to provide additional flexibility for the add-on reinforcement.

These and other benefits of the present invention will become readily understood in the light of the description of a preferred embodiment of the invention that follows.

BRIEF DESCRIPTION OF THE DRAWINGS

In the drawings that form part of a description of a preferred embodiment of the present invention.

FIG. 5 is a frontal view of a windshield of a transparency system for aircraft showing the area of impact used in impact tests to determine the merits of the present invention; and FIG. 6 is a chart comparing the chemical composition and some physical properties of the relatively rigid aft arch of the prior art and the relatively flexible add-on reinforcement of the present invention.

DESCRIPTION OF THE PREFERRED EMBODIMENT

Figure 1:
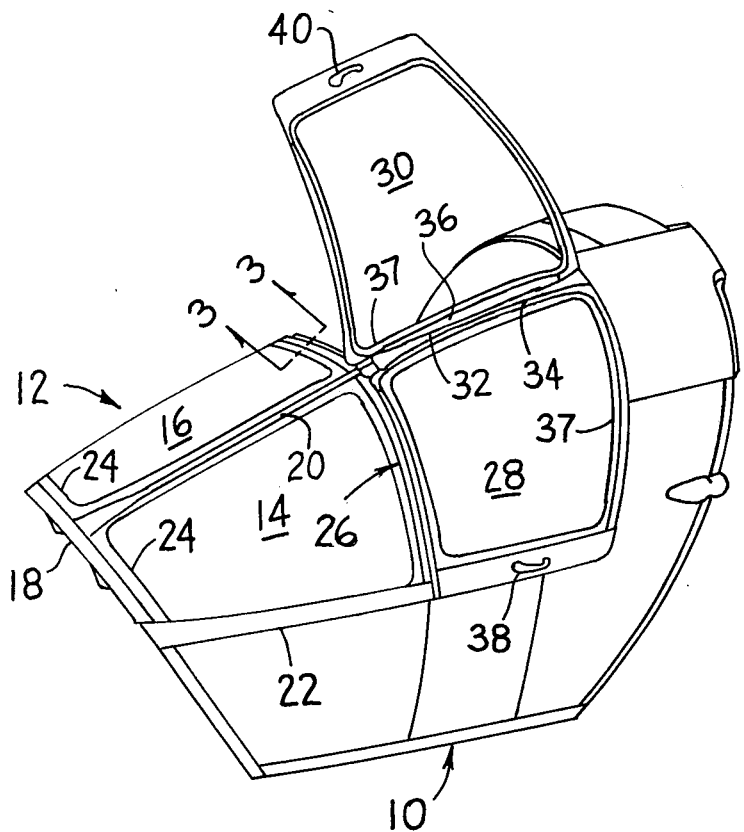
FIG. 1 is a perspective view of a crew module for aircraft containing a pair of windshields and a pair of canopies wherein an aft arch assembly between the windshields and the canopies is reinforced with an add-on reinforcement that can be installed without removing either windshield or either canopy because of the specific novvel construction of the add-on reinforcement of the present invention.
Figure 2:
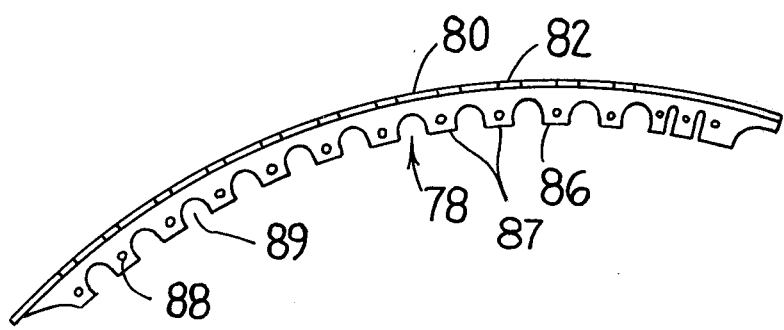
FIG. 2 is an elevational view of an add-on reinforcement according to the present invention.

Referring to the drawings, FIG. 1 shows a perspective view of a crew module 10 provided with a transparency system 12. The transparency system includes a left windshield 14, a right windshield 16, a forward arch 18 extending transverse of the module in advance of the forward edge portions of the windshields, a center beam structure 20 extending longitudinally of the crew module between the longitudinal edges of the windshields 14 and 16 that are adjacent to one another, and a longitudinal sill structure 22 along each of the opposite longitudinally extending edges of each windshield. Only the longitudinal sill structure 22 associated with the left windshield 14 is illustrated because of the orientation of the crew module 10 in FIG. 1.

Each windshield 14 and 16 is provided with an apertured peripheral portion covered by a windshield frame or retainer ring 24 that extends around the perimeter of the windshield. The peripheral portion is secured to the crew module 10 in a manner to be described later.

The crew module also includes an aft arch assembly 26 that extends transversely of the crew module 10 and is interposed between the aft end portions of the windshields 14 and 16 and the forward portions of a left canopy 28 and a right canopy 30. In FIG. 1 the left canopy 28 is shown in a closed position and the right canopy 30 is shown in its open position. The canopies are opened to permit a pilot and co-pilot to enter or leave the module within an airplane.

A center beam aft extension 32 extends longitudinally to the rear of the center beam structure 20 to support a left canopy hinge 34 and a right canopy hinge 36. Each canopy is reinforced with a canopy frame 37. The canopy frames for the respective canopies are rigidly attached to the respective hinges so that the left canopy 28 and its frame 37 pivots about the left canopy hinge 34 and the right canopy 30 and its frame pivots about the right canopy hinge 36.

A left canopy locking latch 38 is provided for the left canopy 28 and a right canopy locking latch 40 is provided for the right canopy 30. The respective locking latches 38 and 40 are recessed so as not to interfere with the streamline design of the outer surface of the crew module 10. The locking latches secure the canopies in locked positions.

Each windshield 14 or 16 is composed of an outer windshield ply 42 of acrylic resin. A typical material for this outer ply 42 is polymethyl methacrylate sold under the trade mark Plexiglas® 55. The windshield also comprises an interlayer 44 attached to the inner surface of the outer windshield 42 and coextensive therewith. Interior of the interlayer 44, which may be of polyurethane or a silicone material suitable for use in laminated windows for aircraft is a first sheet of polycarbonate material 46. The next inner layer of the laminated windshield 14 or 16 is a second layer of interlayer material 48 which also is preferably of a polyurethane or a silicone composition. The laminated windshield also comprises a second polycarbonate sheet 50. The polycarbonate sheets 46 and 50 and the second interlayer are coextensive in area and larger than the outer ply 42 and interlayer 44.

The retainer ring 24 is provided with bolt receiving holes 25 and is preferably composed of a fiber glass reinforced phenolic resin. It surrounds the periphery of the outer windshield ply 42 and the first interlayer 44 and is coextensive at its outer edge with the periphery of the polycarbonate sheets 46 and 50 and the interlayer 48 that bonds the polycarbonate sheets 46 and 50 to one another. Bolt receiving holes 51 are provided, in aligned arrangement with the bolt receiving holes 25, in the peripheral portion of the polycarbonate sheets 46 and 50 and the interlayer 48 to receive windshield attachment bolts which will be described later.

The windshields may comprise an additional thin interlayer of polyurethane or silicone resin and an inner protective layer of a highly abrasion resistant, chemical resistant and thermal resistant material such as glass or certain plastics such as acrylic resins, preferably polymethyl methacrylate. Another variation of the windshields includes more than two thin polycarbonate sheets separated by intervening layers of interlayer material.

A silicone sealant 54 is provided between the inner margin of the fiber glass retainer ring 24 and the outer edge of the outer windshield ply 42 and of the interlayer 44. Preferably, the inner edge of the retainer ring 24 and the outer edge of the outer windshield ply 42 are beveled in parallel to improve the seal therebetween provided by the silicone sealant 54.

The aft edge portions of the windshields 14 and 16 are reinforced by the aft arch assembly 26 which extends arcuately transversely of the length of the aircraft in which the crew module is installed.

Figure 3:
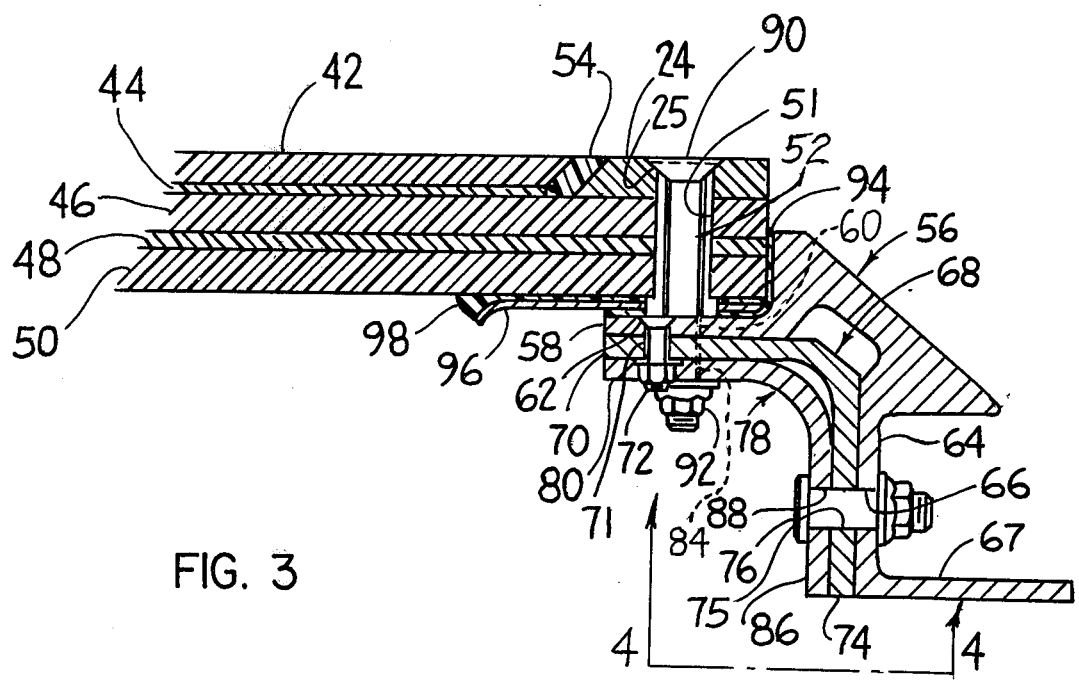
FIG. 3 is an enlarged, fragmentary, cross-sectional view showing how the add-on reinforcement of the present invention is attached to a reinforced aft arch assembly of the prior art that forms part of a transparency system for aircraft that enables such a transparency system to withstand bird impact tests that previous systems containing a reinforced aft arch failed.

As seen in greater detail in FIG. 3, the assembly 26 includes an aft arch 56 having an apertured horizontal flange 58 having a plurality of windshield attachment apertures 60 shown in phantom in FIG. 3, and reinforcement attachment apertures 62. The aft arch 56 also includes an apertured vertical leg 64 provided with apertures 66 and a horizontal aft arch flange 67 that extends to the rear of the bottom of the apertured vertical leg 64. A typical aft arch 56 is reinforced with a rigid aft arch support 68 composed of the same material as the aft arch. The rigid aft arch support 68 comprises an apertured horizontal flange 70 having apertures 71 aligned with apertures 60 in the apertured horizontal flange 58 of the aft arch. Nut and bolt connections 72 connect the apertured horizontal flange 58 of the aft arch 56 and the apertured horizontal flange 70 of the rigid aft arch support 68 through apertures 62 and 71. The rigid aft arch support 68 also has an apertured vertical leg 74, the apertures 75 of which are aligned with the apertures 66 so as to provide means for inserting vertical leg fasteners 76 in the form of nuts and bolts as depicted in FIG. 3.

Each laminated windshield has a center portion which is transparent and an edge portion for fastening to a suitable support structure such as the module 10 or other fuselage members of an aircraft. The bolt receiving holes 25 and 51 are provided through which bolts are disposed for fastening the edge portion of the windshield to the aft arch assembly. A bushing 52 may be installed in each aperture. Each bushing serves primarily to transmit the mounting load of the edge portion to the suitable supporting structure through the thickness of the edge portion and not for transmitting a load parallel to the major surfaces of the window. Suitable bushings are composed of a material that is chemically inert at normal operating temperatures, such as aluminum and stainless steel, for example.

The outer protective ply 42 provided at the outer surface of the windshield is preferably of an abrasion, chemical and thermal resistant material. In this embodiment, the outer protective sheet is of acrylic resin, but it may be of glass or other rigid, transparent material such as the allyl diglycol carbonate disclosed in U.S. Pat. No. 2,370,565, and has a thickness of ⅛ inch (1.6 mm). This material has a good resistance to abrasion and chemical degradation.

The outer interlayer 44 of elastomeric resin, preferably polyurethane, has a thickness greater than 0.015 inch and in this embodiment has a thickness of 0.060 inch (1.5 mm).

The polycarbonate sheets 46 and 50 are disposed under the outer protective sheet 42 and first interlayer 44 and in this embodiment are bonded to a second interlayer 48 of elastomeric resin such as polyurethane.

The polycarbonate resin used for polycarbonate sheets 46 and 50 may be of a material akin to that disclosed in U.S. Pat. Nos. 3,028,365 and 3,117,019 and is preferably one of the polycarbonate resins commercially available under the trademarks "LEXAN" or "MERLON" from General Electric Company and Mobay Chemical Company, respectively.

The polyurethanes preferably used for the interlayers 44 and 48 can broadly described as the reaction product of a polyisocyanate and a polyol which upon lamination forms a transparent interlayer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitnoff test described in Kohler, J. Am. Chem. Soc., 49,3181 (1927). Suitable polyisocyanates are organic diisocyanates which include aromatic, aliphatic, cycloaliphatic and heterocyclic diisocyanates. Examples are 2,4- and 2,6-tolylene disocyanate, 1,4-butane diisocyanate, 1,2-isocyanato-methyl cyclobutane, 4,4-methylene-bis-(cyclohexyl isocyanate), 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC—R—COOH wherein R is an alkylene radical containing from 2 to 12, and preferably 4 to 8, carbon atoms inclusive, examples of which are adipic, succinic, palmitic, suberic, azelaic and sebacic moieties. Suitable aliphatic diols contain from 2 to 15 carbon atoms, exemplary of which are ethylene gycol, 1,3-propanediol, 1,4-butanediol and 1,6-hexanediol. The average molecular weight of the polyester diol should be between 750 and 5000, preferably between 1000 and 3300. The preferred polyester diol is poly (1,4-butylene adipate) having a molecular weight of about 1800 to 2200.

With the thermoplastic polyurethanes the polyisocyanate and the long chain glycol are preferably reacted with a curing agent which has two active hydrogens per molecule. Preferred curing agents are aliphatic diols having from 2 to 15 carbon atoms such as ethylene glycol, 1,3-propane diol, 1,4-butanediol and 1,6-hexanediol. Aminoalcohols and diamines can also be employed. Examples include monoethanolamine and 1,2-ethanediamine.

The thermoplastic polyurethanes can be prepared by pre-acting the organic disocyanate (about 4 molar parts) with the mixture of diols (about 1 molar part long chain diol and 2.8 molar parts curing agent) for about 15 minutes at a temperature of from about 100° and to about 120° C. and then cooling the reaction mixture to a temperature below about 30° C. in order to interrupt the reaction and produce a thermoplastic product which has free isocyanate groups. The plastic can then be extruded into film or thicker sheet form and thinner films of the required thickness skived from the sheet.

A more detailed description on the preparation of such polyurethanes can be found in U.S. Pat. No. 3,931,113 to Seeger and Kaman.

Typical examples of other materials suitable for use as interlayer materials which exhibit good tensile strength retention and embrittlement resistance over a wide range of temperatures are silicones, an example of which is sold as SYLGARD ® 184.

The aft arch assembly 26 may consist of the aft arch 56 or may comprise the aft arch 56 secured to the rigid aft arch support 68. While the aft arch assembly improves the penetration resistance of the windshields 14 and 16, additional penetration resistance would be desired.

According to the present invention, an add-on reinforcement 78 is provided of a relatively flexible metal material compared to the relatively rigid nature of the aft arch 56 and the rigid aft arch support 68 to which the add-on flexible reinforcement is attached. Typical chemical compositions for the aft arch assembly 26 and for the add-on reinforcement 78 are recited in FIG. 6. Also, FIG. 6 lists comparable physical properties of said assembly and said reinforcement.

Figure 4:
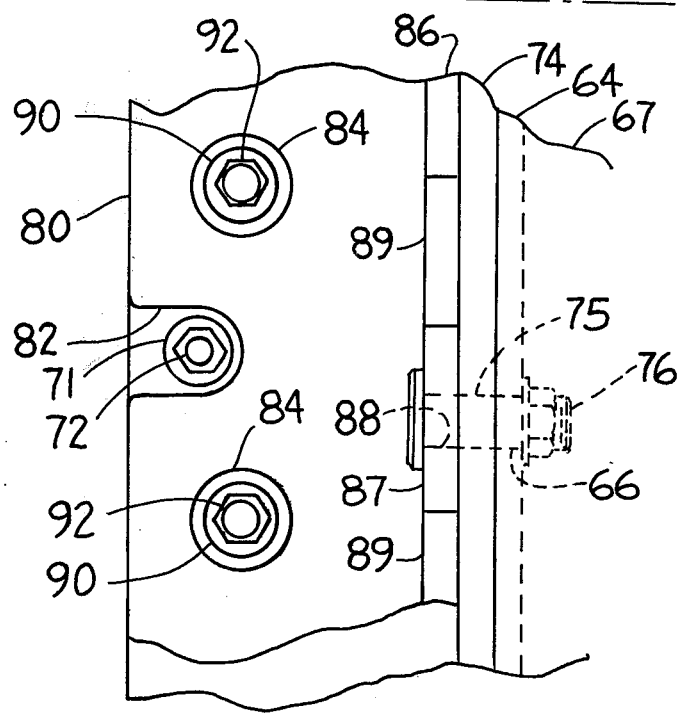
FIG. 4 is an enlarged, fragmentary detailed view taken along the line 4—4 of FIG. 3.

The add-on reinforcement 78 comprises an apertured horizontal flange 80 provided with scallops 82 along the front edge thereof (see FIG. 4). In addition, the horizontal flange 80 is provided with apertures 84 which coincide with the apertures 60 in the horizontal flange 58 and with apertures 71 in the apertured horizontal flange 70 of the rigid aft arch support 68. In addition, the add-on flexible reinforcement 78 has an apertured vertical leg 86 which may also be scalloped to reduce the total weight and improve the flexibility thereof. Scalloping flange 80 and the vertical leg 86 particularly improves the flexibility along their scalloped edges. The apertured vertical leg 86 contains tabs 87 provided with apertures 88 that coincide with the apertures 66 in the vertical leg 64 and with the apertures 75 in the apertured vertical leg 74. FIG. 4 shows some scallops 89 along a scalloped edge of the apertured vertical leg 86 of the add-on flexible reinforcement 78 if such scallops are desired. The scallops 89 alternate with tabs 87.

A windshield attachment bolt 90 extends through each bolt receiving hole 25 of the retainer ring 24 and its aligned bolt receiving hole 51 of the peripheral portion of the aft portion of the windshield 14 or 16 in alignment with the apertures 60 in the horizontal flange 58 of the aft arch 56 and the aligned apertures 71 in the aft arch support 68 provided in the apertured horizontal flange 70 thereof and in the apertures 84 of the apertured horizontal flange 80 for the add-on flexible reinforcement 78. Nuts 92 are provided to secured the attachment bolts 90 in place so that the peripheral portions at the aft ends of the windshields are securely attached to the aft arch assembly 26.

A sealant of silicone 94 is provided for sealing the aft arch 56 to the aft edge of the windshield 14 or 16. In addition, a flexible, stainless steel tab 96 is secured to the inner surface of the inner polycarbonate sheet 50 with a silicone sealant 98 bonding the stainless steel tab 96 to the polycarbonate sheet 50.

Prior to the present invention, a transparency system 12 for a crew module 10 included a reinforced aft arch assembly 56 provided with the rigid aft arch support 68. When tests indicated that improved penetration resistance was required for the structure of the transparency system 12, the present invention suggested an easy method to add on the flexible add-on reinforcement 78 of the present invention in a series of relatively simple steps. These steps included:

1. removing the vertical leg fastener 76 attaching the vertical leg of the aft arch 56 to the vertical leg 74 of the rigid aft arch support 68,
2. removing the nuts 92 from the attachment bolts 90 attaching the aft portion of the left windshield 14 and that of the right windshield 16 to the apertured horizontal flange 58 of the aft arch 56 and the apertured horizontal flange 70 of the aft arch support 68, leaving the remaining attachment bolts of the windshield 14 and 16 secured to the forward arch 18, the center beam structure 20 and the longitudinal sill structures 22 of the crew module 10,
3. assembling the add-on flexible reinforcement 78 with the apertures 88 through the tabs 87 of its scalloped vertical leg 86 aligned with the corresponding respective apertures of the vertical legs 75 and 66 of the aft arch 56 and the aft arch support 68 and the apertures 60 of its horizontal flange 58 aligned with the windshield attachment bolts 90,
4. replacing and tightening the nuts 92 against the windshield attachment bolts 90,
5. applying the vertical leg fasteners 76 through all the aligned apertures 66, 75 and 88 of the vertical legs 64, 74 and 86, and
6. securing the latter fasteners with nuts.

The relative merit of the present invention was compared with that of the prior art transparency systems which did not include the add-on flexible reinforcement 78 of the present invention by impacting 4 pound (1.8 kilogram) birds in the region marked with a plus on the view of the left windshield shown in FIG. 5 at various velocities of impact.

TEST RESULTS

Transparency systems of the prior art provided with a reinforced aft arch assembly including an aft arch support of a rigid titanium alloy failed impact tests at speeds as low as 445 knots using a 4 pound (1.8 kilogram) bird to impact the upper aft corner portion of a windshield of a transparency system in the area marked with a plus mark in FIG. 5. The titanium aft arch and aft arch reinforcement were cracked and bent after such impact test failures and in some tests sheared completely. This area was tested because it is the most critical area of the transparency system to impact since this portion of the windshield becomes more critically stressed than other portions of the windshield during impact.

After transparency systems were reinforced with an add-on reinforcement conforming to the present invention and weighing less than one pound (453.6 grams), impact tests were performed using 4 pound (1.8 kilogram) birds impacting the same location in the windshields of the modified transparency systems. Windshields of transparency systems so modified passed impact tests at speeds of impact of 525 knots. The aft arch, the aft arch support and the add-on reinforcement of the present invention held together as an integral support structure despite some cracking and permanent bending in the aft arch and aft arch support as was observed with prior art reinforced aft arches of transparency systems impacted at much lower velocities of impact. However, the add-on reinforcement of the present invention did not show any cracking after the more severe impact tests at 525 knots and also prevented bird penetration into the crew module.

Windshields of modified transparency systems according to the present invention exhibited less damage at the bolt receiving holes for the windshield attachment bolts after impact at 525 knots than windshields of the prior art transparency systems having aft arch assemblies reinforced with aft arch supports of a relatively rigid titanium alloy after impact at only 445 knots.

The windshields tested had an outer ply of Plexiglas 55 polymethyl methacrylate 125 mils (3.2 mm) thick, and interlayers of polyurethane of the type depicted in U.S. Pat. No. 3,931,113 to Seeger and Kaman 60 mils (1.5 mm) thick alternating with polycarbonate sheets 250 mils (6.35 mm) thick. Such laminated windshields are of the type described and claimed in U.S. Pat. No. 4,081,581 to Littell.

In the windshields tested for impact, the aft arch 56 had a curved length of 26 inches (66 cm) and a cross-sectional configuration as depicted in FIG. 3. The aft arch support 68 had a curved length and width conforming to those of the aft arch 56 and a nominal thickness of $\frac{1}{8}$ inch (3.2 mm) for its horizontal flange 70 and a nominal thickness of 0.150 inch (3.8 mm) for its vertical leg 74. The relatively flexible add-on reinforcement 78 was coextensive in curved length and width with the aft arch 56 and the aft arch support 68, and had a nominal thickness of 3/32 inch (2.4 mm), the scallops 89 in the scalloped edge of the vertical leg 86 had a diameter of 1¼ inches (31.8 mm) and the tabs 87 thereof were ¼ inch (22.2 mm) long and spaced on 2½ inch (63.5 mm) centers. The apertured horizontal flange 80 of the flexible add-on reinforcement had scallops 82 of ½ inch (12.7 mm) diameter and approximately ¾ inch (19.1 mm) deep spaced on 1⅛ inch (28.6 mm) centers.

It is understood that the windshields may include more than two sheets of polycarbonate thinner than 250 mils (6.35 mm) and that the interlayers between adjacent polycarbonate sheets may be thinner than 60 mils (1.5 mm). The specific design of the windshields is not a part of the present invention and may be modified as desired without departing from this invention.

A surprising result of these tests was the substantial improvement in penetration resistance against high speed objects that resulted from the attachment of a relative flexible add-on reinforcement to the relatively rigid aft arch assembly of the prior art transparency system for the crew module.

The form of the invention shown and described in this specification represents an illustrative preferred embodimet with certain modifications thereof. It is

I claim:

1. A crew module for use in aircraft comprising a windshield and a canopy, said windshield including an aft edge portion, an aft arch assembly comprising an aft arch, an aft arch support and attachment means securing said aft arch to said aft arch support, said aft arch assembly interposed between the aft edge portion of the windshield and the front edge of the canopy, said aft arch assembly extending transversely of said crew module and secured thereto to provide reinforcement and resistance to impact penetration for said windshield, said aft arch assembly comprising an apertured flange having apertures aligned with apertures in said windshield along the aft edge portion thereof, an add-on reinforcement comprising on apertured flange having apertures aligned with the apertures of the flange of the aft arch assembly and said apertures for said aft edge portion of said windshield, and attachment bolts extending through said aligned apertures to secure said windshield and said add-on reinforcement to said aft arch assembly, wherein said add-on reinforcement has a scalloped edge provided with scallops corresponding to each of said attachment means to provide clearance for said attachment means between said aft arch and said aft arch support when said add-on reinforcement is secured to said aft arch, aft arch support and said windshield.

2. A crew module as in claim 1, wherein said add-on reinforcement has a weight not exceeding one pound (453.6 grams).

3. A crew module as in claim 1, wherein said add-on reinforcement applied to said aft arch assembly is relatively flexible and said aft arch assembly to which said add-on reinforcement is attached is relatively rigid.

4. A crew module as in claim 3, wherein said aft arch assembly is composed of a relatively rigid titanium alloy and said add-on reinforcement is composed of a relatively flexible, non-magnetic metal alloy.

5. A method of improving the impact resistance of a windshield incorporated in a transparency system for a crew module for aircraft comprising said windshield having an apertured peripheral portion, a canopy, an aft arch assembly interposed between the windshield and the canopy to connect said windshield to said module and provided with apertures aligned with apertures along an aft edge portion of said windshield for attachment thereto by aft edge portion attachment bolts and nuts, the remainder of said peripheral portion of said windshield being attached through apertures by windshield attachment bolts and nuts to said module, said aft arch assembly comprising an aft arch having apertures, an apertured aft arch support having apertures aligned with said apertures of said aft arch, and means securing said aft arch to said aft arch support through said apertures, said method comprising (1) removing the nuts from said aft edge portion attachment bolts attaching the aft edge of the windshield to said aft arch assembly, leaving the remaining attachment bolts extending through the remainder of the peripheral portion of the windshield secured to the crew module, (2) assembling an add-on reinforcement provided with apertures corresponding to the apertures of the aft edge portion of said windshield and a scalloped edge whose scallops coincide with said aligned apertures and securing means of said aft arch and said aft arch support in such a manner that said apertures of said add-on reinforcement are aligned with said first named apertures of said aft arch assembly and said scallops are aligned with said aligned apertures and securing means of said aft arch and said aft arch support, and (3) replacing and tightening the nuts for the aft edge portion attachment bolts to assemble said add-on reinforcement in such relation to said aft arch assembly that said scallops are aligned with said securing means to provide clearance therefor while assembling said add-on reinforcement to said aft arch assembly.

6. The method as in claim 5, wherein said add-on reinforcement is relatively flexible and said aft arch assembly to which said add-on reinforcement is assembled is relatively rigid.

* * * * *